United States Patent [19]

Groll et al.

[11] 4,282,000
[45] Aug. 4, 1981

[54] DYESTUFF SOLUTIONS, THEIR PREPARATION AND THEIR USE FOR DYEING PAPER

[75] Inventors: Manfred Groll, Cologne; Friedhelm Müller, Odenthal, both of Fed. Rep. of Germany

[73] Assignee: Bayer Aktiengesellschaft, Leverkusen, Fed. Rep. of Germany

[21] Appl. No.: 115,529

[22] Filed: Jan. 25, 1980

[30] Foreign Application Priority Data

Feb. 9, 1979 [DE] Fed. Rep. of Germany ....... 2904928

[51] Int. Cl.³ .............................................. C09B 47/08
[52] U.S. Cl. .......................................... 8/527; 8/661; 8/919; 162/162; 260/314.5
[58] Field of Search ..................... 8/1 XA, 7, 527, 661, 8/919; 260/314.5

[56] References Cited

U.S. PATENT DOCUMENTS

| | | | |
|---|---|---|---|
| 4,133,695 | 1/1979 | Wheeler et al. ............ | 260/314.5 |
| 4,198,203 | 4/1980 | Groll et al. ..................... | 8/527 |

FOREIGN PATENT DOCUMENTS

| | | |
|---|---|---|
| 1569727 | 4/1972 | Fed. Rep. of Germany . |
| 2719719 | 1/1978 | Fed. Rep. of Germany . |
| 838418 | 3/1939 | France . |
| 520199 | 4/1940 | United Kingdom . |
| 1046520 | 10/1966 | United Kingdom . |

*Primary Examiner*—A. Lionel Clingman
*Attorney, Agent, or Firm*—Sprung, Felfe, Horn, Lynch & Kramer

[57] ABSTRACT

Aqueous solutions of copper phthalocyanine-sulphonic acid salts of the formula

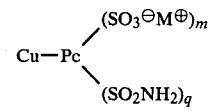

in which
Cu—Pc a copper phthalocyanine radical,
m a number from 1.8 to 3.0,
q a number from 1.0 to 2.0, with the proviso that the sum m+q is a number from 2.8 to 4.0, and
$M^\oplus$ a mixture of $A_n^\oplus$ and an ammonium ion of the formula

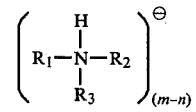

wherein
$A^\oplus$ represents an alkali metal ion or $NH_4$ ion,
n represents a number from 0.8 to 2.0,
m has the meaning indicated above,
$R_1$ and $R_2$ designate hydrogen, $C_1$—$C_4$—alkyl or a radical —$(CH_2$—$CH_2$—$O)_p$—H and
$R_3$ designates the radical —$(CH_2$—$CH_2$—$O)_p$—H,
wherein
p is 1, 2, 3, 4, 5 or 6, process for the preparation of these solutions and their use for dyeing paper.

9 Claims, No Drawings

DYESTUFF SOLUTIONS, THEIR PREPARATION AND THEIR USE FOR DYEING PAPER

The invention relates to solutions of copper phthalocyanine-sulphonic acid salts of the formula

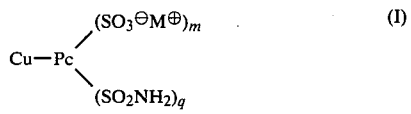

in which
Cu-Pc a copper phthalocyanine radical,
m a number from 1.8 to 3.0,
q a number from 1.0 to 2.0, with the proviso that the sum m+q is a number from 2.8 to 4.0, and
$M^\oplus$ a mixture of $A_n^\oplus$ and an ammonium ion of the formula

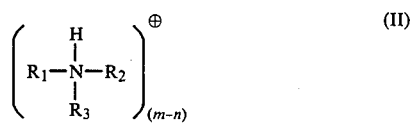

wherein
$A^\oplus$ represents an alkali metal ion or $NH_4$ ion,
n represents a number from 0.8 to 2.0,
m has the meaning indicated above,
$R_1$ and $R_2$ designate hydrogen, $C_1$—$C_4$—alkyl or a radical —$(CH_2$—$CH_2$—$O)_p$—H and
$R_3$ designates the radical —$(CH_2$—$CH_2$—$O)_p$—H, wherein
p is 1, 2, 3, 4, 5 or 6,
in water, which can contain up to 10% of its weight of organic solvents, a process for the preparation of these solutions and their use for dyeing paper.

Solutions of copper phthalocyanine-acid salts of the type described in which
$R_1$, $R_2$ and $R_3$ designate —$CH_2$—$CH_2$—O—$CH_2$—$CH_2$—OH, or
$R_1$ designates —$CH_2$—$CH_2$—OH and
$R_2$ and $R_3$ designate —$C_2H_5$, or
$R_1$ designates —$CH_2$—$CH_2$—OH and
$R_2$ and $R_3$ designate —$CH_3$,
are of particular interest.

It is known that finished dyestuff solutions are increasingly employed for dyeing paper, since compared with pulverulent dyestuffs, these give rise to considerable industrial advantages in the dyeing of paper. However, the requirements demanded of the dyestuff solutions with regard to the dyestuff concentration, the storage stability and the suitability for use in the production of dyed papers are high, for example the electrolyte content of the solutions should be as low as possible. These requirements frequently cannot be fulfilled or can be fulfilled only with considerable expense. This is particularly true for blue-green to turquoise-coloured shades, which are in general achieved with copper phthalocyanine-sulphonic acids.

The degree to which the dyestuff solutions according to the invention fulfil the requirements made is particularly good. Moreover, they are simple to prepare on an industrial scale and have a particularly low electrolyte content.

For their preparation, copper phthalocyanine is treated with chlorosulphonic acid and, if appropriate, thionyl chloride in the customary manner until 2.8 to 4.0 sulpho groups, of which 0.7 to 1.5 should be present as sulphonic acid groups and the remainder should be present as sulphonic acid chloride groups, have been introduced into the phthalocyanine molecule.

The sulphonation melt is discharged onto ice and the copper phthalocyanine-(sulphonyl chloride)-sulphonic acid which has precipitated is filtered off and washed with 0.5% strength ice-cold hydrochloric acid. The copper phthalocyanine-(sulphonyl chloride)-sulphonic acid paste is worked into a slurry with ice-water and reacted with ammonia and an amine of the formula

wherein
$R_1$, $R_2$ and $R_3$ have the abovementioned meaning, in the desired concentration, if appropriate with the addition of an alkali metal hydroxide as an acid-binding agent, to give the solution according to the invention.

The solutions according to the invention are outstandingly suitable for dyeing paper, either in pulp form or on the surface, by the dyeing processes customary for this.

Dyeings on paper which are obtained using the new dyestuff solutions show only a slight colour change to green in a weakly acid medium.

EXAMPLE 1

57.5 g of copper phthalocyanine are dissolved in 435 g of chlorosulphonic acid and the solution is stirred at 125° C. for about 5 hours until about 3.4 sulphonic acid groups have been introduced into the phthalocyanine molecule. The melt is cooled to 25° C. and discharged onto ice, during which the temperature of the suspension formed should not exceed +3° C. The copper phthalocyanine-(sulphonyl chloride)-sulphonic acid which has precipitated is filtered off and washed with about 2,000 ml of 0.3% strength ice-cold hydrochloric acid.

The copper phthalocyanine-(sulphonyl chloride)-sulphonic acid paste is worked into a slurry with 100 ml of ice-water, and a mixture of 70 ml of 5 N ammonia, 50 ml of 2 N sodium hydroxide solution and 60 g of tris-[2-(2-hydroxy-ethoxy)-ethyl]-amine is added. The temperature of the suspension is now increased slowly to 25° C. and the suspension is stirred at this temperature for some hours and heated briefly to 70°–80° C. in order to end the reaction. After cooling, the mixture is neutralised, if appropriate, with a little tris-[2-(2-hydroxy-ethoxy)-ethyl]-amine and is clarified, if necessary with the addition of a little clarifying auxiliary.

A concentrated dyestuff solution of the sulphonated copper phthalocyanine is obtained and is particularly suitable for dyeing paper.

Dyestuff solutions of similar concentration are obtained when the tris-[2-(2-hydroxy-ethoxy)-ethyl]-amine mentioned in paragraph 2 (of this example) is replaced by equivalent amounts of 2-(2-dimethylamino-ethoxy)-ethanol, 2-(2-diethylaminoethoxy)-ethanol, dimethylamino-ethanol, diethylamino-ethanol, bis-(2-hydroxyethyl)-methylamine, tris-(2-hydroxyethyl)-amine or tris-(2-hydroxypropyl)-amine.

EXAMPLE 2

10 g of a 0.5% strength solution of the liquid dyestuff formulation according to Example 1, paragraph 2, are added to 200 g of a 2.5% strength paper pulp, consisting of 50% of bleached pine sulphite and 50% of bleached birch sulphite and having a freeness of SR 35°, whilst stirring. Sizing is then effected with 10 g of a 1% strength rosin size solution and 20 g of a 1% strength aluminium sulphate solution and the pulp is diluted with 500 g of water. After stirring for 15 minutes, the dyed paper pulp is poured onto a sheeter with a filter paper underlay and is filtered. The sheet of paper is couched in a press between two sheets of filter paper and felts of equal size and is then dried at 100° C. on a hot cylinder for about 5 minutes. A paper dyed a brilliant turquoise is obtained.

EXAMPLE 3

10 g of the liquid dyestuff formulation obtained according to Example 1, paragraph 2, are stirred into a sizing press solution consisting of 50 g of cationic starch and 20 g of a sizing agent (ABS polymer) and the base papers or slightly sized papers are dyed at a throughput rate of about 5 to 7 m/minue at 20° C. and with a print coverage of about 25%. Papers dyed a uniformly brilliant turquoise are obtained.

We claim:

1. Aqueous solutions of copper phthalocyaninesulphonic acid salts of the formula

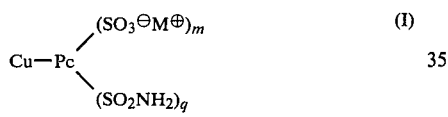

in which
Cu-Pc a copper phthalocyanine radical,
m a number from 1.8 to 3.0,
q a number from 1.0 to 2.0, with the proviso that the sum m+q is a number from 2.8 to 4.0, and
$M^\oplus$ a mixture of $A_n^\oplus$ and an ammonium ion of the formula

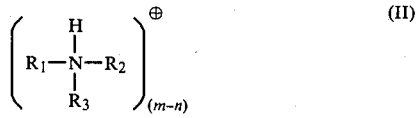

wherein
$A^\oplus$ represents an alkali metal ion or $NH_4$ ion,
n represents a number from 0.8 to 2.0,
m has the meaning indicated above,
$R_1$ and $R_2$ designate hydrogen, $C_1$—$C_4$—alkyl or a radical —$(CH_2$—$CH_2$—$O)_p$—H and
$R_3$ designates the radical —$(CH_2$—$CH_2$—$O)_p$—H, wherein
p is 1, 2, 3, 4, 5 or 6.

2. Aqueous solutions according to claim 1, wherein $R_1$, $R_2$ and $R_3$ designate —$CH_2$—$CH_2$—O—$CH_2$—$CH_2$—OH.

3. Process for the preparation of solutions according to claim 1, characterised in that copper phthalocyanine-(sulphonyl chloride)-sulphonic acids with 2.8 to 4.0 sulpho groups, of which 0.7 to 1.5 groups are present in the form of sulphonic acid groups, are reacted with ammonia and an amine of the formula

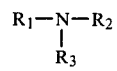

wherein
$R_1$, $R_2$ and $R_3$ have the meaning indicated in claim 1.

4. Process according to claim 3 wherein an alkali metal hydroxide is added as an acid-binding agent.

5. An aqueous solution according to claim 1, wherein $R_1$ designates $C_2H_5$ and $R_3$ is —$CH_2CH_2OH$.

6. An aqueous solution according to claim 1, wherein $R_2$ designates $CH_3$ and $R_3$ designates —$CH_2CH_2OH$.

7. An aqueous solution according to claim 1, wherein $R_1$ designates $C_2H_5$, $R_2$ designates $CH_3$ and $R_3$ designates —$CH_2CH_2OH$.

8. Process for dyeing paper, characterised in that dyestuff solutions according to claim 1 are used.

9. A copper phthalocyanine-sulphonic acid salt of the formula

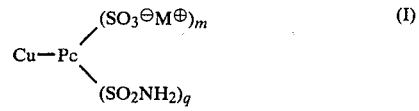

in which
Cu-Pc a copper phthalocyanine radical,
m a number from 1.8 to 3.0,
q a number from 1.0 to 2.0, with the proviso that the sum m+q is a number from 2.8 to 4.0, and
$M^\oplus$ a mixture of $A_n^\oplus$ and an ammoniun ion of the formula

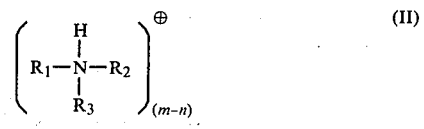

wherein
$A^\oplus$ represents an alkali metal ion or $NH_4$ ion,
n represents a number from 0.8 to 2.0,
m has the meaning indicated above,
$R_1$ and $R_2$ designate hydrogen, $C_1$—$C_4$—alkyl or a radical —$(CH_2$—$CH_2$—$O)_p$—H and
$R_3$ designates the radical —$(CH_2$—$CH_2$—$O)_p$—H, wherein
p is 1, 2, 3, 4, 5 or 6.

* * * * *